US012579600B2

(12) United States Patent
Suryanarayana et al.

(10) Patent No.: US 12,579,600 B2
(45) Date of Patent: Mar. 17, 2026

(54) SEAMLESS VIDEO IN HETEROGENEOUS CORE INFORMATION HANDLING SYSTEM

(71) Applicant: Dell Products L.P., Round Rock, TX (US)

(72) Inventors: Shekar Babu Suryanarayana, Bangalore (IN); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 17/877,606

(22) Filed: Jul. 29, 2022

(65) Prior Publication Data

US 2024/0037694 A1 Feb. 1, 2024

(51) Int. Cl.
*G06T 1/60* (2006.01)
*G06T 1/20* (2006.01)
*G06T 11/00* (2006.01)

(52) U.S. Cl.
CPC .................. *G06T 1/60* (2013.01); *G06T 1/20* (2013.01); *G06T 11/00* (2013.01)

(58) Field of Classification Search
None
See application file for complete search history.

(56) References Cited

U.S. PATENT DOCUMENTS

| | | | | |
|---|---|---|---|---|
| 2008/0244250 A1* | 10/2008 | Swanson | ............... | G06F 9/4401 713/1 |
| 2010/0026692 A1* | 2/2010 | Lew | ........................... | G06T 1/20 345/506 |
| 2010/0138675 A1* | 6/2010 | Nikazm | .................... | G06F 1/26 713/300 |
| 2022/0113784 A1* | 4/2022 | Alben | .................... | G06F 1/3287 |
| 2022/0197624 A1* | 6/2022 | Chiu | ........................ | G06F 8/65 |
| 2022/0197651 A1* | 6/2022 | Kumar | ...................... | G06T 1/60 |
| 2022/0246110 A1* | 8/2022 | Muddegowda | .... | H04N 21/4542 |
| 2022/0270538 A1* | 8/2022 | Lin | ...................... | G06F 3/1454 |

FOREIGN PATENT DOCUMENTS

EP 2648107 A1 * 10/2013 .......... G06F 9/5066

* cited by examiner

*Primary Examiner* — Aaron M Richer
(74) *Attorney, Agent, or Firm* — Jackson Walker L.L.P.

(57) ABSTRACT

A disclosed method includes employing a hybrid context sensing protocol to learn power and video capabilities of a platform to perform seamless graphics remediations, providing a video management module to handle video policies and thermal attributes for seamless recovery of video capabilities across firmware updates/rollbacks, and implementing a hybrid video firmware (HVF) to create a virtual video domain to partially or fully utilize video capabilities based on platform power budgeting policies. The method may further include maintaining a silicon agnostic protected sync of a map between the video random access memory (VRAM) and GPU memory to ensure seamless High Bandwidth Digital Content Protect (HDCP) capability rendering on targeted video devices. The method further comprises using a system on chip (SoC)-agnostic runtime VRAM for uninterrupted graphics rendering across integrated graphics processing unit (iGPU) to discrete GPU (dGPU) transitions or switches.

14 Claims, 4 Drawing Sheets

300

400

SEAMLESS VIDEO IN HETEROGENEOUS CORE INFORMATION HANDLING SYSTEM

TECHNICAL FIELD

The present disclosure relates to heterogeneous information handling systems and, more particularly, systems capable of driving a display device with integrated or discrete graphics.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A hybrid core system is a type of information handling system that employs more than one type of processing core, typically including one or more efficient cores and one or more performance cores. An efficient core is generally slower than a performance core, but consumes less power and generates less thermal energy, i.e., heat. By executing performance-tolerant threads on efficient cores and performance-demanding threads on performance cores, heterogeneous systems attempt to support use cases that might not be possible using a single type of processing core. The efficient/performance distinction may be applicable to a general purpose central processing unit (CPU) and a dedicated purpose processor, such as a graphics processing unit (GPU). However, the distinction can also apply to two different GPUs such as the distinction between an integrated GPU (iGPU) and a dedicated GPU (dGPU) where the iGPU represents an efficient core and the dGPU represents a performance core.

Display shifting is one feature supported by heterogeneous architectures. Display shifting enables a system to drive a display device with either an efficient core, such as a CPU (vs. a GPU) or an iGPU (vs. a dGPU). Laptops typically cannot dissipate thermal energy fast enough to support full throttle CPU and GPU execution. Accordingly, fixed/static power limits are typically imposed on both cores and conventional systems, making it difficult or impractical to implement functionality for dynamically controlling power sharing based on contextual indicators. Issues that may arise when platform video is not handled with context specific dynamic rendering include, as non-limiting examples, temporary or permanent display blank outs that occur when switching between integrated graphics (igfx) and dedicated graphics (dgfx), degraded resolution and rendering, and so forth. In addition, static configurations may increase power consumption, degrade battery life and/or degrade performance, and cause completely loss of certain functionality including high-bandwidth digital content protection (HDCP).

SUMMARY

Common problems associated with statically configured heterogeneous applications and systems are addressed by methods and systems disclosed herein.

In one aspect, disclosed methods support the use of system on chip (SoC)-agnostic runtime video random access memory (VRAM) for uninterrupted graphics rendering across iGPU to dGPU transitions or switches. A hybrid context sensing protocol may be employed to learn various power and video capabilities of the platform to perform seamless graphics remediations. A failover video management module may handle video policies and thermal attributes for seamless recovery of video capabilities across firmware updates/rollbacks. A hybrid video firmware (HVF) may be implemented to create a virtual video domain to partially or fully utilize video capabilities based on platform power budgeting policies for better performance gaming experiences. A silicon agnostic protected sync of the map between the VRAM and GPU memory may ensure seamless High Bandwidth Digital Content Protect (HDCP) capability rendering on targeted video devices.

In one aspect, a disclosed method includes employing a hybrid context sensing protocol to learn power and video capabilities of a platform to perform seamless graphics remediations, providing a video management module to handle video policies and thermal attributes for seamless recovery of video capabilities across firmware updates/rollbacks, and implementing a hybrid video firmware (HVF) to create a virtual video domain to partially or fully utilize video capabilities based on platform power budgeting policies. The method may further include maintaining a silicon agnostic protected sync of a map between the VRAM and GPU memory to ensure seamless HDCP capability rendering on targeted video devices. The method further comprises using a system on chip (SoC)-agnostic runtime video random access memory (VRAM) for uninterrupted graphics rendering across integrated graphics processing unit (iGPU) to discrete GPU (Dgpu) transitions or switches.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
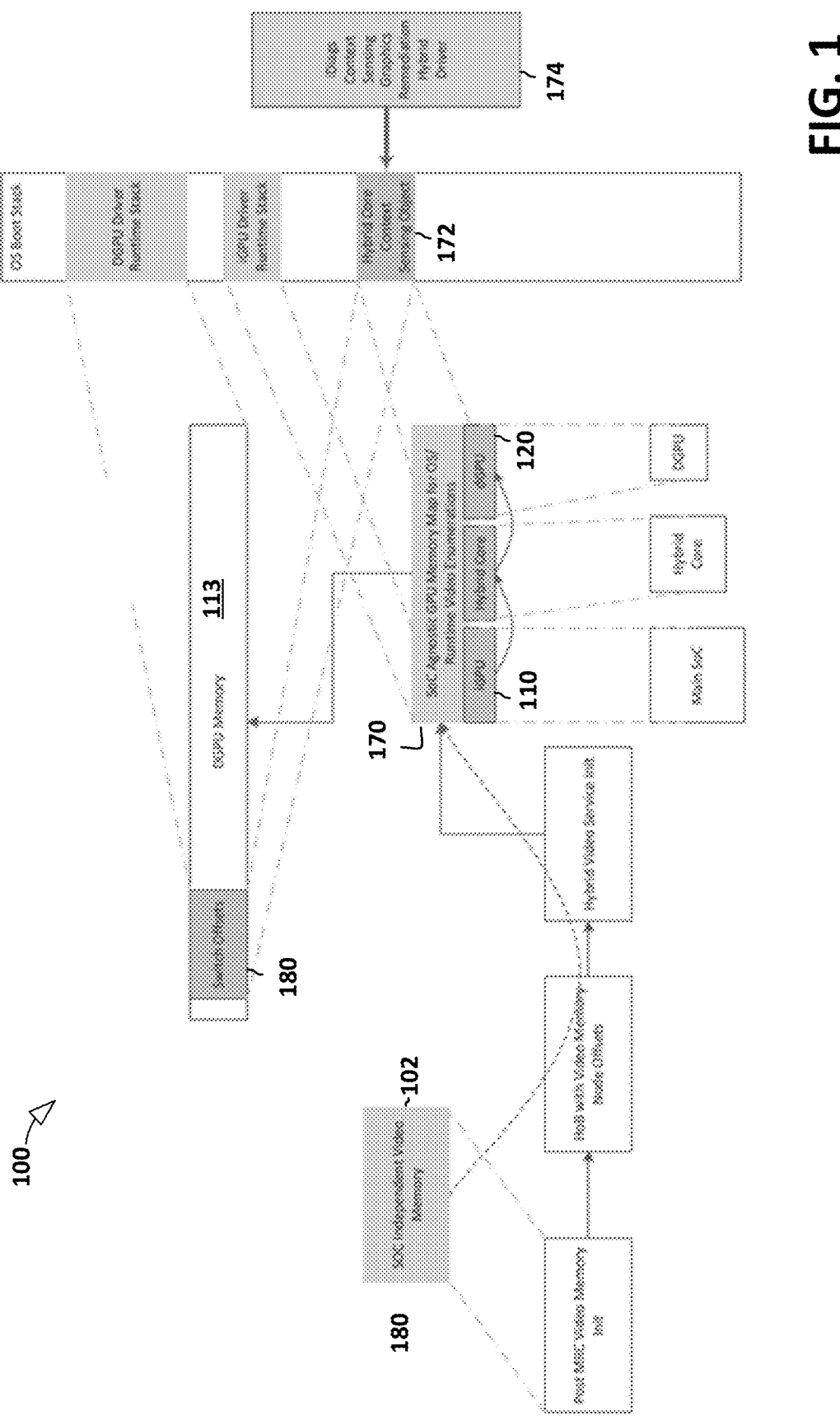
FIG. 1 illustrates an exemplary process for creating a runtime Video RAM memory map for uninterrupted graphics rendering across iGPU/dGPU switches.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 depicts a process 100 for creating an SoC-agnostic runtime video RAM memory map 170 to facilitate uninterrupted graphics rendering across iGPU/dGPU transitions. An SoC-independent video memory 102 is initialized during pre-boot, e.g., early pre-EFI initialization (PEI) phase of a UEFI boot sequence, for a hybrid core system (e.g. Intel Hybrid Core, AMD Zen core, etc.) to execute runtime dynamic video rendering and switching. An iGPU 110 and dGPU 120 access an overlay memory map with a Hybrid video memory map where a hybrid core handles the switch. The illustrated process supports dynamic enumeration for runtime video operations. A dGPU memory 113 and iGPU memory will have a dedicated memory map 170 with a context sensing object 172 managed by an iDiags-based remediation driver 174.

The iDiags context sensing graphics remediation driver 174 operates independent of the main CPU and runs explicitly on hybrid core to provide seamless and dynamic graphics rendering to address the previously identified switching issues with a context sensing protocol described herein.

Context sensing may occur from a power efficiency perspective as well as a video application usage perspective based on factors such as how many applications need low resolution video rendering vs. gaming/picture edit applications that need high end graphics rendering. The context sensing protocol may sense the current context and all connected display units. Based on supported resolutions and applications, the switching happens to render gaming streams on dGPU 120 and less demanding graphic streams on iGPU 110. Conventional display shifting lacks a resource analogous to memory map 170 and switch offsets 180 are not generated.

In at least some embodiments, the previously referenced hybrid context sensing protocol learns various power and video capabilities of the platform and performs seamless graphics remediations.

Figure 2:
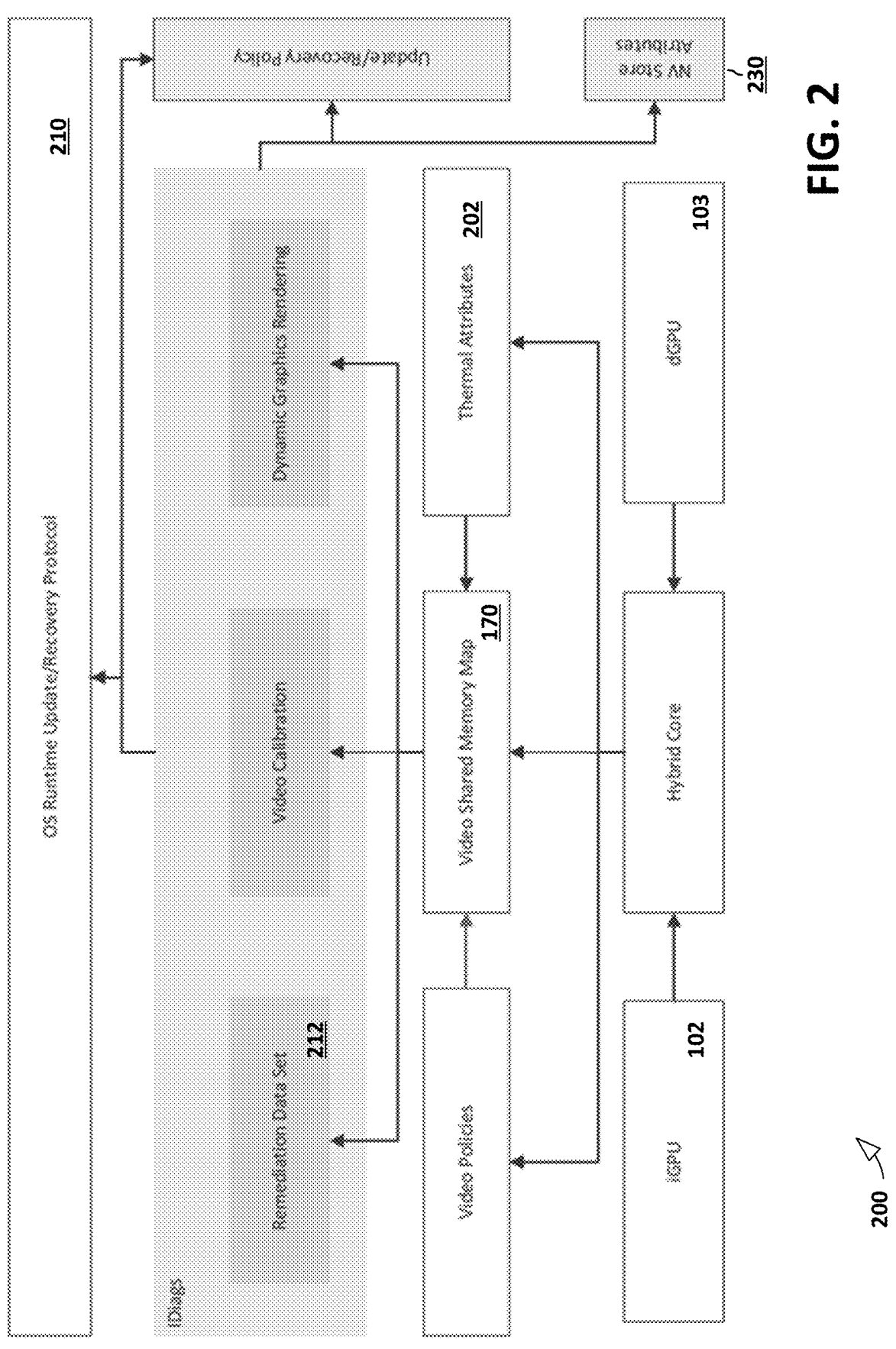
FIG. 2 illustrates an exemplary video management module to handle remediations and video/thermal attributes to recover video capabilities across firmware updates/rollbacks.

Referring now to FIG. 2, an illustrated video management module 200 handles iDiags Remediations and video/thermal attributes for seamless recovery of video capabilities across firmware updates/rollbacks. The hybrid core-based video shared memory map 170 enables dynamic capture of iGPU/dGPU based video/thermal attributes 202 from previous firmware versions and the update time calibrations are calculated, along with remediation data set 212, and published for update drivers to pick and execute the update process.

After a successful firmware update, the dGPU/iGPU shared map is located in the next boot, dynamic video calibrations are done, and rendering attributes are updated to OS video drivers to operate seamlessly.

The iDiags runtime update/recover protocol 210 plays a crucial role in learning all video glitches and reinitializes video memory map 170 from the Hybrid core context and shifts the rendering offset to iGPU or dGPU based on context. The same is updated at firmware attributes NV store 230 for subsequent reboots.

In at least some embodiments, iDiags remediations are primarily based on deep learning attributes for idea/thermal switching and HD graphics rendering. This deep learning also aids in generation of a remediation data set 212 for calibrations of running video on iGPU/dGPU memory by passing the video offsets from share video memory map 170 as depicted in the diagram.

Figure 3:
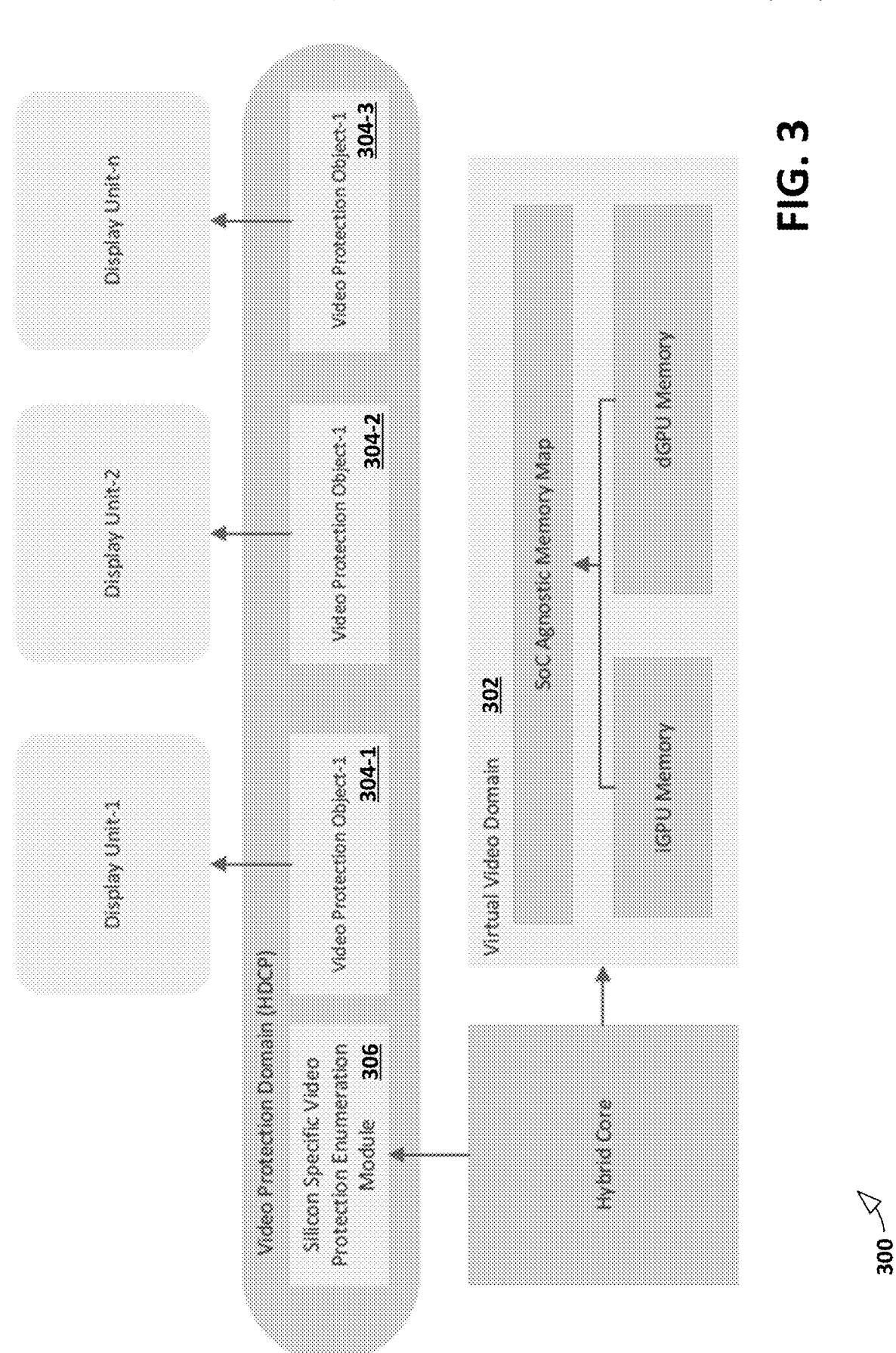
FIG. 3 illustrates an exemplary hybrid video firmware (HVF) to create a virtual video domain to utilize video capabilities based on platform power budgeting policies.

Referring now to FIG. 3, an illustrated hybrid video firmware (HVF) 300 creates a virtual video domain 302 to fully or partially utilize video capabilities based on platform power budgeting policies for better performance and user experience. Virtual video domain 302 may be created based on iGPU and dGPU memory map 170. A hybrid core may sense the video capabilities from the connected video ports and create the SoC agnostic video rendering and protection object 304, which can be mapped to iGPU memory or dGPU memory based on current video frame rendering context which is an industry first solution integrated into iDiags Context sensing and dynamic rendering protocol.

With the illustrated hybrid video firmware, a full range of iGPU/dGPU compute utilization can be achieved. The video protection domain is created for dynamic security key push across various video memories, the video protection object is created based on current connected video ports, and HDCP security keys are pushed while video buffer is rendering for control centric decode. This way the HDCP protection can become seamless and video play/streaming can be done without any interruption.

HDCP capability rendering across all or selected display units is done statically from silicon vendors, e.g., Intel, AMD, etc., with the video protection object enumeration module 306, a seamless video port can be controlled for various rendering attributes. A dedicated virtual video object is created per connected display which is mapped across iGPU/dGPU and hybrid core handles it dynamically.

Figure 4:
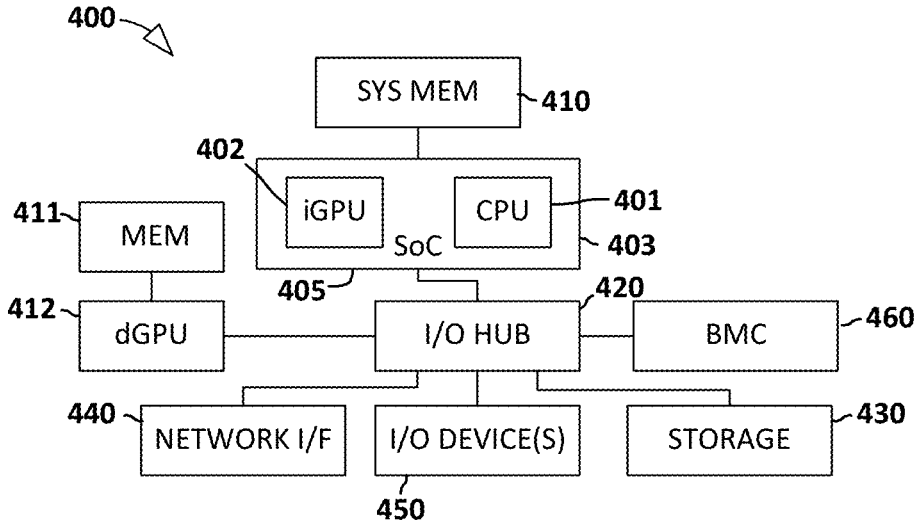
FIG. 4 illustrates an information handling system suitable for implementing features illustrated in FIG. 1 through FIG. 3.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a system memory 410 and to an input/output hub 420 to which various I/O resources and/or components are communicatively coupled.

The CPU 401 illustrated in FIG. 4 is part of a hybrid core or SoC 405 that includes, in addition to CPU 401, an iGPU 402. The illustrated system 400 further include a dGPU 412 coupled to I/O hub 420 and a corresponding dGPU memory 411 coupled dGPU 412.

Other I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:

employing a hybrid context sensing protocol to learn a rendering context based, at least in part, on power and video capabilities of a platform comprising an integrated graphics processing unit (iGPU), a discrete graphics processing unit (dGPU), and a hybrid core to perform uninterrupted-graphics rendering across iGPU to dGPU transitions or switches, wherein said uninterrupted rendering includes shifting a rendering offset to either the iGPU or dGPU based on the rendering context;

implementing a runtime video random access memory (VRAM) including a hybrid core based video shared memory map for uninterrupted graphics rendering across iGPU to dGPU transitions or switches to render gaming streams on the dGPU and less demanding graphic streams on the iGPU, wherein the uninterrupted graphics rendering across iGPU to dGPU transitions or switches includes shifting a rendering offset to either the iGPU or the dGPU;

providing a video management module to handle video policies and thermal attributes for recovery of video capabilities across firmware updates/rollbacks; and following a successful firmware update and a subsequent boot, locating the video shared memory map, performing dynamic video calibrations, and updating rendering attributes of one or more video drivers.

2. The method of claim 1, further comprising maintaining a silicon agnostic protected sync of a map between video random access memory (VRAM) and graphics processing unit (GPU) memory to ensure uninterrupted High Bandwidth Digital Content Protection (HDCP) capability rendering on targeted video devices.

3. The method of claim 1, further comprising implementing hybrid video firmware (HVF) to create a virtual video domain to partially or fully utilize video capabilities based on platform power budgeting policies.

4. The method of claim 1, further comprising initializing a system on chip (SoC)-independent video memory to execute runtime dynamic video rendering and switching.

5. The method of claim 4, wherein the SOC-independent video memory is initialized during an early pre-EFI initialization (PEI) phase.

6. The method of claim 1, wherein the platform includes an overlay memory map with Hybrid video memory map where a hybrid core handles a switch and dynamic enumeration for runtime video operations.

7. The method of claim 1, wherein the context sensing protocol senses a current context and all connected display units based on supported resolutions.

8. An information handling system, comprising:

a central processing unit (CPU); and a computer readable medium including processor executable program instructions that, when executed by the CPU, cause the information handling system to perform operations including:

employing a hybrid context sensing protocol to learn a rendering context based, at least in part, on power and video capabilities of a platform comprising an integrated graphics processing unit (iGPU), a discrete graphics processing unit (dGPU), and a hybrid core to perform uninterrupted graphics rendering across iGPU to dGPU transitions or switches, wherein said uninterrupted rendering includes shifting a rendering offset to either the iGPU or dGPU based on the rendering context;

implementing a runtime video random access memory (VRAM) including a hybrid core based video shared memory map for uninterrupted graphics rendering across iGPU to dGPU transitions or switches to render gaming streams on the dGPU and less demanding graphic streams on the iGPU, wherein the uninterrupted graphics rendering across iGPU to dGPU transitions or switches includes shifting a rendering offset to either the iGPU or the dGPU;

providing a video management module to handle video policies and thermal attributes for recovery of video capabilities across firmware updates/rollbacks; and following a successful firmware update and a subsequent boot, locating the video shared memory map, performing dynamic video calibrations, and updating rendering attributes of one or more video drivers.

9. The information handling system of claim 8, wherein the operations further include maintaining a silicon agnostic protected sync of a map between the video random access memory (VRAM) and graphics processing unit (GPU) memory to ensure uninterrupted High Bandwidth Digital Content Protection (HDCP) capability rendering on targeted video devices.

10. The information handling system of claim 8 wherein the operations include implementing hybrid video firmware (HVF) to create a virtual video domain to partially or fully utilize video capabilities based on platform power budgeting policies.

11. The information handling system of claim 8, wherein the operations include initializing a system on chip (SoC)-independent video memory to execute runtime dynamic video rendering and switching.

12. The information handling system of claim 8, wherein the SOC-independent video memory is initialized during early pre-EFI (PEI) phase.

13. The information handling system of claim 8, wherein the platform includes an overlay memory map with a Hybrid video memory map where a hybrid core handles a switch and dynamic enumeration for runtime video operations.

14. The information handling system of claim 8, wherein the context sensing protocol senses a current context and all connected display units based on supported resolutions.

\* \* \* \* \*